UNITED STATES PATENT OFFICE.

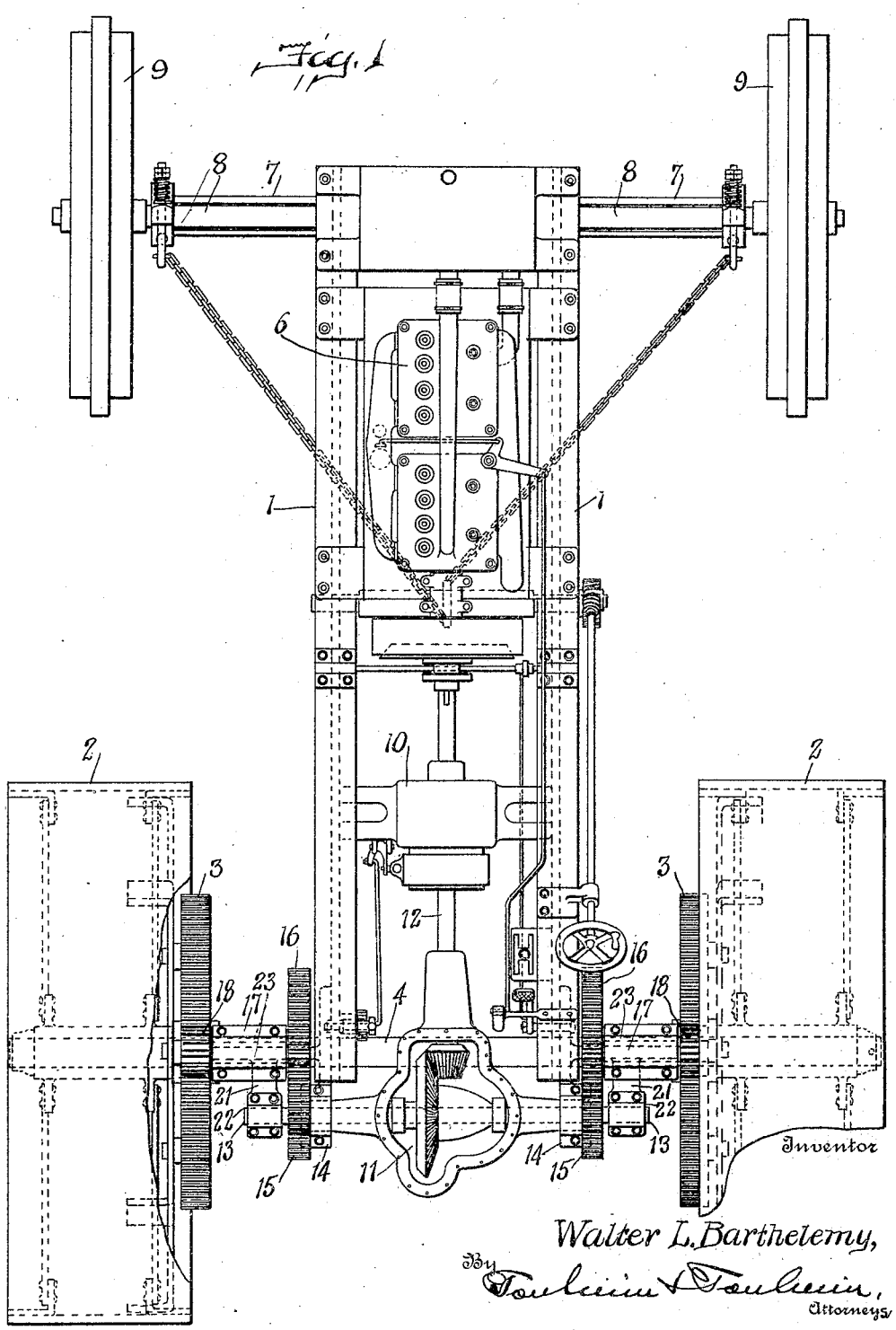

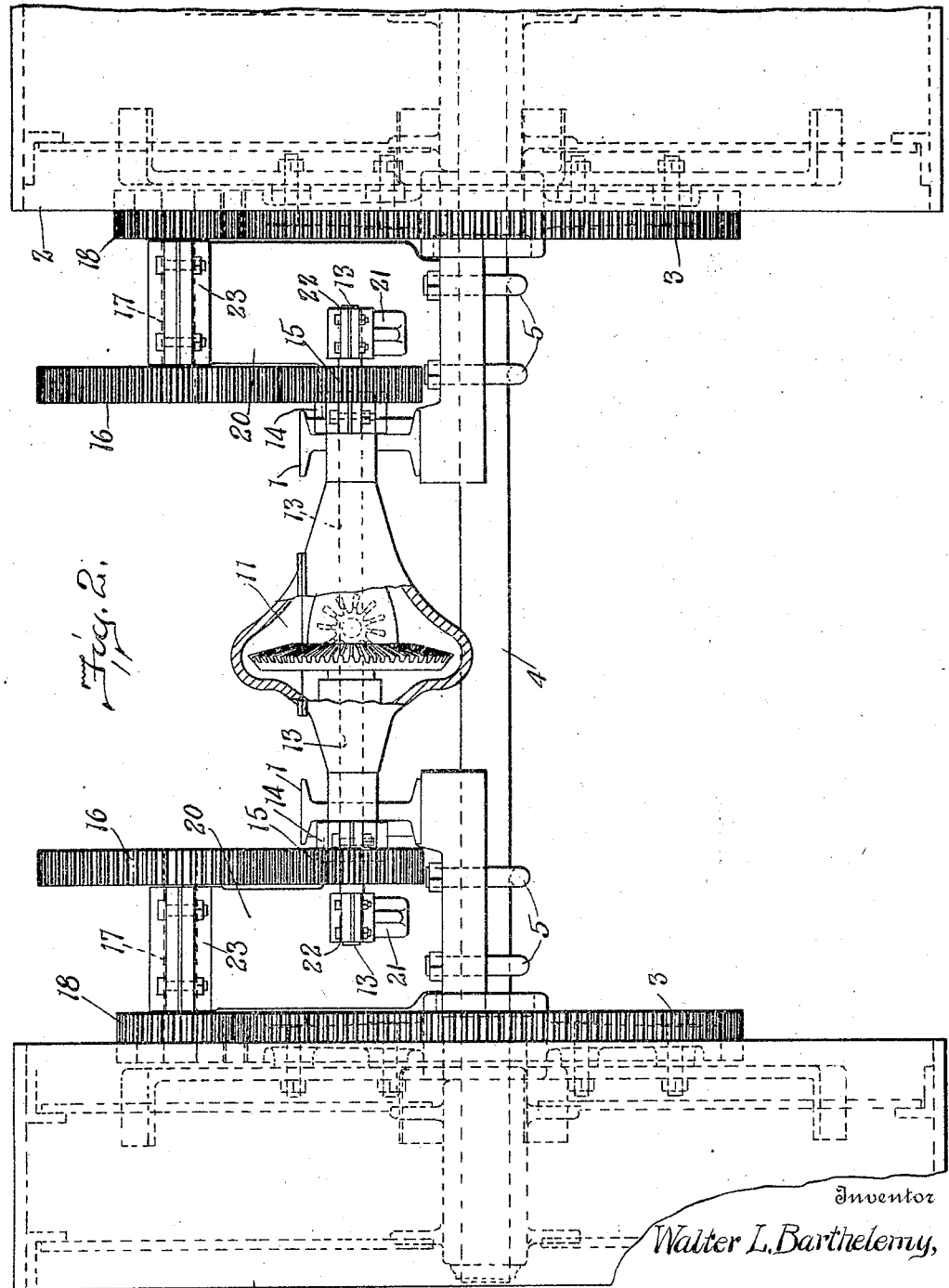

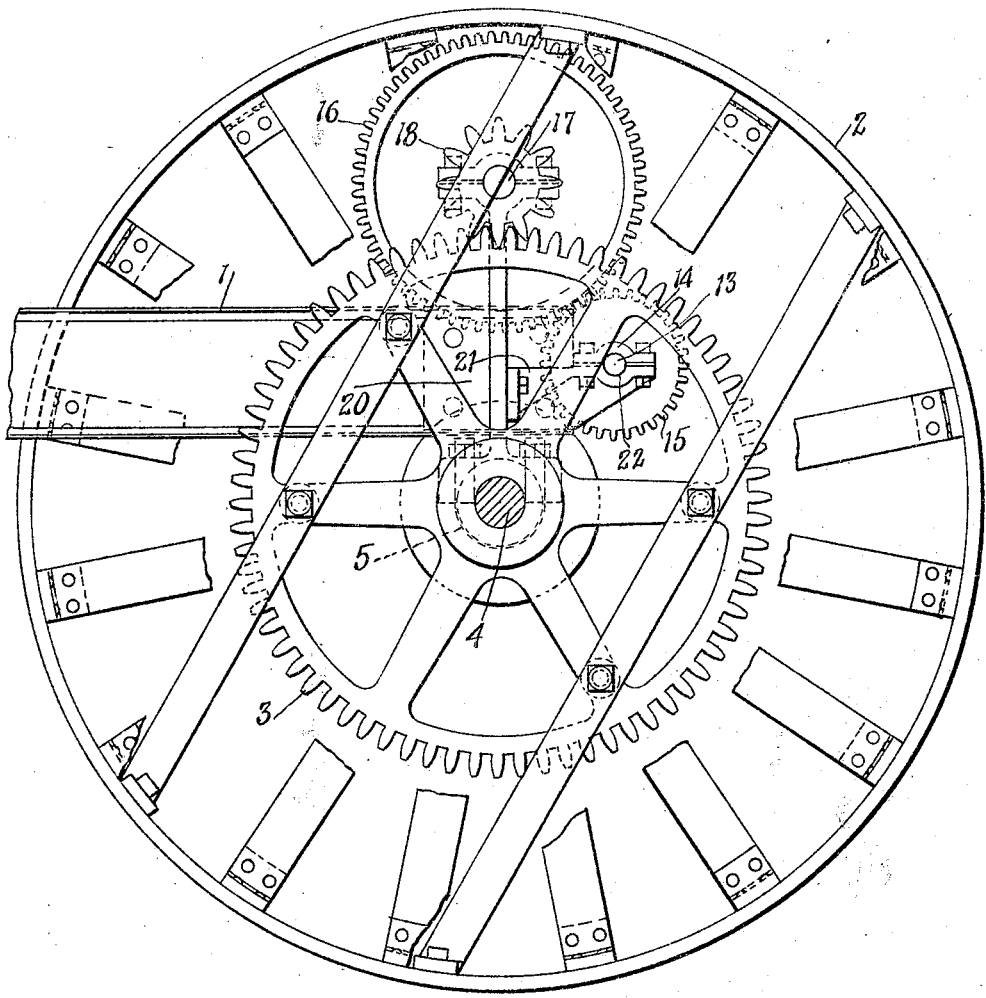

WALTER L. BARTHELEMY, OF DAYTON, OHIO.

TRACTOR.

1,378,002. Specification of Letters Patent. Patented May 17, 1921.

Application filed January 20, 1919. Serial No. 271,945.

*To all whom it may concern:*

Be it known that I, WALTER L. BARTHELEMY, a citizen of the United States, residing at Dayton, in the county of Montgomery and State of Ohio, have invented certain new and useful Improvements in Tractors, of which the following is a specification, reference being had therein to the accompanying drawing.

This invention relates to tractors and has for its particular object to provide an improved farm tractor which may be made cheaply but which will have all the advantages in power and features of general improvement of high priced machines.

Incident to the novel features of construction of my improved tractor I have evolved a method of utilizing the engine, transmission and differential gearing, rear axle and other parts of used automobiles in which the required parts are still in good condition and capable of further use. As is well known the engines and transmission mechanism of the better makes of automobiles are usually in good condition when the machines generally may be much worn or out of date and can, therefore, be purchased at a low price. It frequently happens that farmers themselves have old automobiles of this character, the parts of which may be utilized to build excellent farm tractors of the character contemplated in my invention which will be equal to and even better than present types of high priced tractors.

An important advantage of my invention consists in the simplicity of the underlying principle of construction, thus making it possible to build the tractors in any machine shop or well equipped farm work shop. Thus with a coöperating manufacturer to supply the additional parts which are necessary to build the tractors any average farm community is possessed of means to build the tractors at very low cost by using automobile equipment which otherwise would have little or no value.

In applying the invention I employ in connection with the engine and standard transmission and change gear equipment of an automobile an arrangement of reducing gearing whereby the power of the engine from a high speed machine is utilized to operate a low speed tractor, the engine speed as applied to the tractor being the same as in the automobile with a corresponding increase of tractor power. As here shown, reducing gearing is used substantially as 12 to 1. Thus, to illustrate, an engine which at a given speed will drive an automobile 36 miles per hour will at the same speed drive a tractor only three miles per hour. This gain in power will, of course, be further multiplied through the change gearing by shifting to the low and intermediate positions, respectively. Thus, it will be seen that by my arrangement a tractor of great power may be provided merely by transferring thereto the standard engine and transmission equipment of an automobile and supplying reducing gearing in the manner contemplated in my invention.

A further important improvement realized in my invention results from the arrangement of the main supporting axle and the relation of the differential gearing thereto. As distinguished from the common practice in tractor construction I employ a fixed or stationary axle and utilize the cut-off, floating axle, standard transmission and differential gearing transferred from an automobile in connection with reducing gearing to transmit power to the tractor wheels.

As here shown my invention has been applied to a machine having two tractor wheels. It is obvious, of course, that the invention will apply equally to a machine having a single tractor wheel and may, by suitable modification, be applied to any of the usual arrangements of the tractor wheel or wheels without departing from the underlying principles of the invention.

Referring to the drawings:

Figure 1 is a plan view of the tractor showing the manner in which my invention is applied thereto;

Fig. 2 is a rear elevation of the tractor showing the manner of securing the fixed axle to the main frame, and Fig. 3 is a side elevation taken on the inside of one of the tractor wheels showing the relation of the reducing gearing thereto.

As shown in Fig. 1 of the drawings, parallel frame pieces, preferably consisting of channel or I-beams 1, are provided to support the engine, transmission and change gear mechanism and to join the front and rear trucks of the tractor together. This arrangement results in a simple, but very rigid supporting frame and provides also for mounting the engine well forward toward the front truck where it will act to balance the weight and side or rear draft of the tractor, thereby preventing any tendency of the front end of the tractor to rear or rise from the ground which is a serious fault of present well-known types of tractors and is caused by having the weight too evenly balanced over the rear axle or driving center.

The tractor wheels 2 may be of any suitable construction. As here shown the wheels are more or less of conventional form and are used for illustration purposes only, except that the wheels are provided with fixed gears 3 which, as here shown, are essential to the complete application of the invention. The tractor wheels are supported on a stationary axle 4 which may be secured to the main frame by suitable U-bolts 5.

The engine 6 and the front truck 7—8—9 are also shown merely in conventional form for illustration purposes, no novelty being claimed with respect to these features of the tractor; this also applies to the transmission gearing 10 and differential gearing 11 which may be of any of the well-known standard forms of construction.

In order to transfer such mechanism, however, from an automobile to the tractor frame it is necessary to shorten by cutting off one end of the drive shaft 12 to adapt it to the shorter coupling of the tractor; also to cut off both ends of the floating rear axle 13 to adapt it to the reducing gearing interposed between the differential gearing and the tractor wheels.

The reducing gearing, obviously, may be of any desired ratio and may be interposed between the differential gearing and one or more tractor wheels in any suitable manner. As here shown the cut-off axles 13 are preferably provided with fixed bearings 14 secured to the flanged beams 1. Secured to the projecting ends of the axle or drive shaft 13 is a reducing pinion 15, meshing with a gear 16. The gear 16 is connected by a shaft 17 to a further reducing pinion 18 secured to the opposite end of shaft 17 and meshing with the gear 3 which is rigidly secured to the tractor wheel; the reducing gearing as here shown, applying to both tractor wheels.

A suitable supporting bracket 20, bolted to the flanged beams of the main frame and further supported in any suitable manner on the rear axle 4 is provided to support the reducing gearing in suitable bearings 22 and 23; the main portion of the bracket 20 having an extension 21 in which the bearing 22 is located.

From the foregoing detailed description the essential features of construction and arrangement, as well as the underlying principles of my invention will be clearly understood. It will be seen that by a simple, practicable method, supplemented by the novel features of construction and arrangement described, any standard engine and transmission and differential mechanism of an automobile or truck, may be transferred bodily, substantially without change, except as noted, to a suitable tractor frame, and that by employing a system of reducing gearing the full power of a high speed engine may be utilized most advantageously to operate a low speed tractor; that the engine and driving gearing of used or discarded automobiles may thus be utilized to construct a tractor at exceedingly low cost, but having all the qualities of a high priced machine. It is, of course, obvious that tractors embodying my invention, in view of its simple construction, may be built of new parts throughout at a cost comparing favorably with low cost machines.

As far as I am aware I am the first to develop a practicable method of tractor construction comprising essentially the principles and features of the present invention. In view of the great and urgent need of developing efficient farm tractors which may be sold at low cost with a guarantee as to their effective usefulness, the importance of my invention, as relating to the present rapid trend toward power operation on the farm, will be readily appreciated.

In view of the broad fundamental principle underlying my invention, I do not wish to be limited, except as broadly defined and comprehended in the accompanying claims, to the details of construction and arrangement here shown, as a widely modified application of the invention may be made by those skilled in the art without departing from or materially adding to the essential features thereof.

Having thus fully described my invention, what I claim as new and desire to secure by Letters Patent, is:—

1. In a tractor, the combination, with a frame, of an engine and transmission and differential gearing transferred thereto, said gearing being rigidly mounted on said frame, a shortened drive shaft connecting said gearing, a bracket secured to said frame, a fixed axle and tractor wheels mounted thereon, a cut-off floating axle having fixed bearings in said bracket and reducing gearing, whereby power is transmitted from the engine through said gearing to the tractor wheels.

2. In a tractor, the combination, with a frame, of an engine and standard transmission and differential gearing transferred thereto, said gearing being fixed to said frame, a bracket secured to said frame, a fixed axle and tractor wheels mounted thereon, shafts having bearings in said bracket, and reducing gearing whereby power from said engine is transmitted through said gearing to the tractor wheels.

3. In a tractor, the combination, with a tractor frame, of an engine, transmission and differential gearing of an automobile mounted directly thereon, a fixed axle having tractor wheels and a frame secured thereto, a rear axle and casing, the rear axle having a bearing carried by the fixed axle and the casing attached to the frame, and reducing gearing of an automobile mounted upon said frame, the rear axle being shortened to form a suitable connection with said reduction gearing, whereby power from said engine is transmitted through said gearing to the tractor wheels.

4. In a tractor, the combination with a tractor-frame, an engine and transmission and differential gearing of an automobile mounted directly thereon, a fixed axle and a tractor wheel secured thereto, reducing gearing and a shortened rear axle of the automobile including an axle casing all attached to the frame, connections whereby power from the engine is transmitted through said gearing to the tractor wheel and steering mechanism including a steering rod also attached to said frame.

5. In a tractor, the combination with a tractor-frame, an engine and transmission and differential gearing mounted directly thereon, a fixed axle and a tractor wheel secured thereto and having a fixed gear thereon, reducing gearing and connections including a shortened rear axle drive-shaft, an axle casing all rigidly secured to the frame, whereby power from the engine is transmitted through said gearing to the tractor wheel.

6. In a tractor, the combination, with a stationary axle, of tractor wheels mounted thereon, each of said wheels having a fixed gear secured thereto, a frame, transmission and differential gearing, and a shortened drive shaft and reducing gearing all rigidly secured to said frame and interposed between said differential gearing and each of said tractor wheels.

7. In a tractor, the combination, with a stationary axle, of a tractor wheel mounted thereon, said wheel having a fixed gear secured thereto, a frame, transmission and differential gearing, and a shortened drive shaft and casing all rigidly secured to said frame and reducing gearing interposed between said differential gearing and said tractor wheel.

8. In a tractor, the combination, with a stationary axle, of tractor wheels mounted thereon, each of said wheels having a fixed gear secured thereto, a frame, standard transmission and differential gearing and a cut-off rear axle drive shaft and casing transferred to the tractor and reducing gearing interposed between said transmission gearing and each of said tractor wheels and rigidly secured to said stationary axle and frame.

9. In a tractor, the combination, with a stationary axle, of a tractor wheel mounted thereon, said wheel having a fixed gear secured thereto, standard transmission and differential gearing and a cut-off rear axle drive shaft transferred to the tractor having bearings at each end rigid with said stationary axle, and reducing gearing interposed between said transmission gearing and said tractor wheel with bearings therefor on said stationary axle.

10. In a tractor, the combination of forwardly steering and rear drive wheels and axles joined together by a frame having directly mounted thereon the engine, rear axle, transmission and differential gearing of an automobile, the rear axle being shortened and carrying thereon between the rear drive wheels reducing gears and other reducing gears carried on the rear axle for transmitting power between the shortened axle and the tractor wheels.

11. In a tractor, the combination of forward and rear fixed axles having steering and drive wheels mounted thereon, respectively, and joined together by a frame adapted to have mounted thereon the engine, rear axle, transmission and differential gearing of an automobile, the rear axle being shortened and carrying at each end reducing gears, other reducing gears mounted on the rear axle for transmitting power to the driven wheels.

In testimony whereof, I affix my signature.

WALTER L. BARTHELEMY.